US008130979B2

(12) United States Patent
Harney et al.

(10) Patent No.: US 8,130,979 B2
(45) Date of Patent: Mar. 6, 2012

(54) NOISE MITIGATING MICROPHONE SYSTEM AND METHOD

(75) Inventors: Kieran P. Harney, Andover, MA (US); Jason Weigold, Somerville, MA (US); Gary Elko, Summit, NJ (US)

(73) Assignee: Analog Devices, Inc., Norwood, MA (US)

( * ) Notice: Subject to any disclaimer, the term of this patent is extended or adjusted under 35 U.S.C. 154(b) by 1572 days.

(21) Appl. No.: 11/492,314

(22) Filed: Jul. 25, 2006

(65) Prior Publication Data

US 2007/0047744 A1    Mar. 1, 2007

Related U.S. Application Data

(60) Provisional application No. 60/710,515, filed on Aug. 23, 2005.

(51) Int. Cl.
*H04B 15/00* (2006.01)

(52) U.S. Cl. ....... 381/94.7; 381/91; 381/94.1; 381/94.3; 381/113; 381/176; 381/184

(58) Field of Classification Search .................... 381/26, 381/63, 71.1, 94.1, 94.7, 91–92, 122, 111, 381/113–114, 182, 175, 368, 94.3, 176, 184
See application file for complete search history.

(56) References Cited

U.S. PATENT DOCUMENTS

| 3,025,359 A | 3/1962 | Schilling et al. ............. 179/110 |
| 4,524,247 A | 6/1985 | Lindenberger et al. ....... 179/111 |
| 4,533,795 A | 8/1985 | Baumhauer, Jr. et al. ..... 179/111 |
| 4,558,184 A | 12/1985 | Busch-Vishniac et al. ... 179/111 |
| 4,825,335 A | 4/1989 | Wilner ........................ 361/283 |
| 4,837,834 A * | 6/1989 | Allie .......................... 381/71.14 |
| 5,146,435 A | 9/1992 | Bernstein ..................... 367/181 |
| 5,178,015 A | 1/1993 | Loeppert et al. ............... 73/718 |
| 5,226,087 A * | 7/1993 | Ono et al. ...................... 381/92 |
| 5,303,210 A | 4/1994 | Bernstein ..................... 367/181 |
| 5,388,163 A | 2/1995 | Elko et al. .................... 381/191 |
| 5,452,268 A | 9/1995 | Bernstein ..................... 367/181 |
| 5,490,220 A | 2/1996 | Loeppert ...................... 381/168 |
| 5,596,222 A | 1/1997 | Bernstein ..................... 257/620 |
| 5,633,552 A | 5/1997 | Lee et al. ..................... 310/311 |

(Continued)

FOREIGN PATENT DOCUMENTS

EP    0 452 103 A2    10/1991

(Continued)

OTHER PUBLICATIONS

European Patent Office, *Communication pursuant to Article 94(3) EPC*, European Patent Office, Nov. 4, 2008, 5 pages.

(Continued)

*Primary Examiner* — Devona Faulk
*Assistant Examiner* — Disler Paul
(74) *Attorney, Agent, or Firm* — Sunstein Kann Murphy & Timbers LLP (57) ABSTRACT

A microphone system has a base coupled with first and second microphone apparatuses. The first microphone apparatus is capable of producing a first output signal having a noise component, while the second microphone apparatus is capable of producing a second output signal. The system also has combining logic operatively coupled with the first microphone apparatus and the second microphone apparatus. The combining logic uses the second output signal to remove at least a portion of the noise component from the first output signal.

14 Claims, 6 Drawing Sheets

U.S. PATENT DOCUMENTS

| | | | | |
|---|---|---|---|---|
| 5,673,325 A * | 9/1997 | Andrea et al. | | 381/92 |
| 5,684,324 A | 11/1997 | Bernstein | | 257/415 |
| 5,740,261 A | 4/1998 | Loeppert et al. | | 381/168 |
| 5,870,482 A | 2/1999 | Loeppert et al. | | 381/174 |
| 5,917,921 A * | 6/1999 | Sasaki et al. | | 381/94.1 |
| 5,956,292 A | 9/1999 | Bernstein | | 367/140 |
| 6,145,186 A * | 11/2000 | Beavers | | 29/594 |
| 6,243,474 B1 | 6/2001 | Tai et al. | | 381/174 |
| 6,249,075 B1 | 6/2001 | Bishop et al. | | 310/338 |
| 6,308,398 B1 * | 10/2001 | Beavers | | 29/594 |
| 6,330,336 B1 * | 12/2001 | Kasama | | 381/71.1 |
| 6,493,288 B2 * | 12/2002 | Khuri-Yakub et al. | | 367/181 |
| 6,677,176 B2 | 1/2004 | Wong et al. | | 438/50 |
| 6,722,206 B2 * | 4/2004 | Takada | | 73/779 |
| 6,741,709 B2 | 5/2004 | Kay et al. | | 381/175 |
| 6,781,231 B2 | 8/2004 | Minervini | | 257/704 |
| 6,829,131 B1 | 12/2004 | Loeb et al. | | 361/234 |
| 6,845,165 B1 * | 1/2005 | Motohashi et al. | | 381/98 |
| 6,914,992 B1 | 7/2005 | van Halteren et al. | | 381/113 |
| 7,146,016 B2 * | 12/2006 | Pedersen | | 381/175 |
| 7,433,484 B2 * | 10/2008 | Asseily et al. | | 381/355 |
| 2003/0063762 A1 | 4/2003 | Tajima et al. | | 381/111 |
| 2003/0133588 A1 | 7/2003 | Pedersen | | 381/423 |
| 2003/0228019 A1 * | 12/2003 | Eichler et al. | | 381/71.8 |
| 2004/0028239 A1 * | 2/2004 | Watson et al. | | 381/86 |
| 2004/0184633 A1 | 9/2004 | Kay et al. | | 381/355 |
| 2005/0063553 A1 | 3/2005 | Ozawa | | 381/92 |
| 2005/0089188 A1 | 4/2005 | Feng | | 381/396 |
| 2005/0234715 A1 * | 10/2005 | Ozawa | | 704/226 |

FOREIGN PATENT DOCUMENTS

| | | |
|---|---|---|
| EP | 0 978 978 A2 | 2/2000 |
| JP | 2002-171591 | 6/2002 |
| JP | 2003-102097 | 4/2003 |
| JP | 2003-111186 | 4/2003 |
| JP | 2004-201033 A | 7/2004 |
| JP | 2005-057437 | 3/2005 |
| WO | WO 01/20948 | 3/2001 |
| WO | WO 2005/036698 | 4/2005 |

OTHER PUBLICATIONS

Ozawa Kazuhiko, *Patent Abstracts of Japan*, Publication No. 2004201033, Jul. 15, 2004, 1 page.

Authorized Officer Viorel Moscu, *International Search Report and Written Opinion of the International Searching Authority*, International Application No. PCT/US2006/032931, May 14, 2007, 11 pages.

Japanese Patent Office, Official Action—Application No. 2008-528115, dated Feb. 9, 2011 (4 pages).

Japanese Patent Office, English Translation of Official Action—Application No. 2008-528115, dated Feb. 9, 2011 (6 pages).

Neumann, Jr. et al., *A Fully-Integrated CMOS-MEMS Audio Microphone*, The 12$^{th}$ International Conference on Solid State Sensors, Actuators and Microsystems Jun. 8-12, 2003, 4 pages.

Bajdechi et al., *Single-Chip Low-Voltage Analog-to-Digital Interface for Encapsulation with Electret Microphone*, The 11$^{th}$ International Conference on Solid-State Sensors and Actuators, Jun. 10-14, 2001, 4 pages.

Schafer et al., *Micromachined Condenser Microphone for Hearing Aid Use*, Solid-State Sensor and Actuator Workshop, Jun. 8-11, 1998, 4 pages.

Maxim Integrated Products, *Electret Condenser Microphone Cartridge Preamplifier*, Maxim Integrated Products, Jul. 2002, 9 pages.

Pedersen et al., *A Polymer Condenser Microphone on Silicon with On-Chip CMOS Amplifier*, Solid State Sensors and Actuators, 1997, 3 pages.

Bernstein et al., *High Sensitivity MEMS Ultrasound Arrays by Lateral Ferroelectric Polarization*, Solid-State Sensor and Actuator Workshop, Jun. 4-8, 2000, 4 pages.

Hall et al., *Self-Calibrating Micromachined Microphones with Integrated Optical Displacement Detection*, The 11th International Conference on Solid State Sensors and Actuators, Jun. 10-14, 2001, 4 pages.

Weigold et al., *A MEMS Condenser Microphone for Consumer Applications*, Analog Devices, Inc. and Pixtronix, Inc., Jan. 22, 2006, 4 pages.

* cited by examiner

*Fig. 6*

NOISE MITIGATING MICROPHONE SYSTEM AND METHOD

PRIORITY

This patent application claims priority from provisional U.S. patent application No. 60/710,515, filed Aug. 23, 2005, entitled, "MICROPHONE SYSTEM," and naming Kieran Harney as the inventor, the disclosure of which is incorporated herein, in its entirety, by reference.

FIELD OF THE INVENTION

The invention generally relates to microphones and, more particularly, the invention relates to improving the performance of microphones.

BACKGROUND OF THE INVENTION

Condenser microphones typically have a diaphragm that forms a capacitor with an underlying backplate. Receipt of an audible signal causes the diaphragm to vibrate to form a variable capacitance signal representing the audible signal. It is this variable capacitance signal that can be amplified, recorded, or otherwise transmitted to another electronic device.

Problems arise, however, when the microphone is subjected to a mechanical shock. Specifically, mechanical shocks can cause the diaphragm to vibrate in a manner that degrades the microphone output signal.

SUMMARY OF THE INVENTION

In accordance with one embodiment of the invention, a microphone system has a base coupled with first and second microphone apparatuses. The first microphone apparatus is capable of producing a first output signal having a noise component, while the second microphone apparatus is capable of producing a second output signal. The system also has combining logic operatively coupled with the first microphone apparatus and the second microphone apparatus. The combining logic uses the second output signal to remove at least a portion of the noise component from the first output signal.

The second output signal may have, among other things, data relating to the mechanical response of the first microphone apparatus. Moreover, the second microphone apparatus may have a diaphragm and a cap acoustically sealing the diaphragm. Alternatively, the diaphragm may be exposed to a space to which another diaphragm in the system is exposed. In some embodiments, the second microphone apparatus has a microphone and a low pass filter.

Various embodiments of the first microphone apparatus have a first microphone, while the second microphone apparatus has a second microphone. The second microphone may be configured to have a low frequency cut-off that is greater than the low frequency cut-off of the first microphone. In addition, the first microphone may have a first diaphragm and a first circumferential gap defined at least in part by the first diaphragm, while the second microphone may have a second diaphragm and a second circumferential gap defined at least in part by the second diaphragm. The second circumferential gap illustratively is greater than the first circumferential gap. This second gap effectively mitigates low frequency audio components while the filter, if used, substantially removes or mitigates remaining audio component.

To remove at least a portion of the noise components produced by mechanical shock, the second microphone apparatus may have a microphone and a signal transformation module (e.g., an adaptive filter).

In accordance with another embodiment of the invention, a microphone system has a base coupled with first and second microphone apparatuses. The first microphone apparatus is capable of producing a first output signal and has a first microphone with a first mechanical response. In a similar manner, the second microphone apparatus is capable of producing a second output signal and has a second microphone with a second mechanical response. The system also has combining logic operatively coupled with the first and second microphone apparatuses. The combining logic combines the first and second output signals to produce an output audio signal. The first and second mechanical responses illustratively are effectively the same.

Among other things, the combining logic may include a subtractor that subtracts the second output signal from the first output signal. In other embodiments, the combining logic may have an adder.

In accordance with another embodiment of the invention, a method of producing an output audio signal from a microphone system provides a base having a first microphone for generating a first microphone output signal (having an audio component and a mechanical component) in response to an input audio signal and a mechanical signal. The base also has a second microphone for generating a second microphone output signal in response to the mechanical signal. The method uses information from the second microphone output signal to remove at least a portion of the mechanical component from the first microphone output signal.

The second microphone output signal may have a second audio component. In that case, the method may remove at least a portion of the second audio component from the second microphone output signal. In addition, the method may adaptively filter the second microphone output signal. Among other ways, the method may remove at least a portion of the second audio component from the second microphone output signal before adaptively filtering.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

In illustrative embodiments, a microphone system has a primary microphone and a correction microphone coupled to the same base to both receive the same noise signals (e.g., mechanical shock signals) and react in a corresponding manner. To improve the quality of the output audio signal it produces, the microphone system uses noise signals detected by the correction microphone to remove significant amounts of noise from the signal produced by the primary microphone. As a result, the output audio signal should have less noise than if not processed and noise is present. Details of illustrative embodiments are discussed below.

Figure 1:
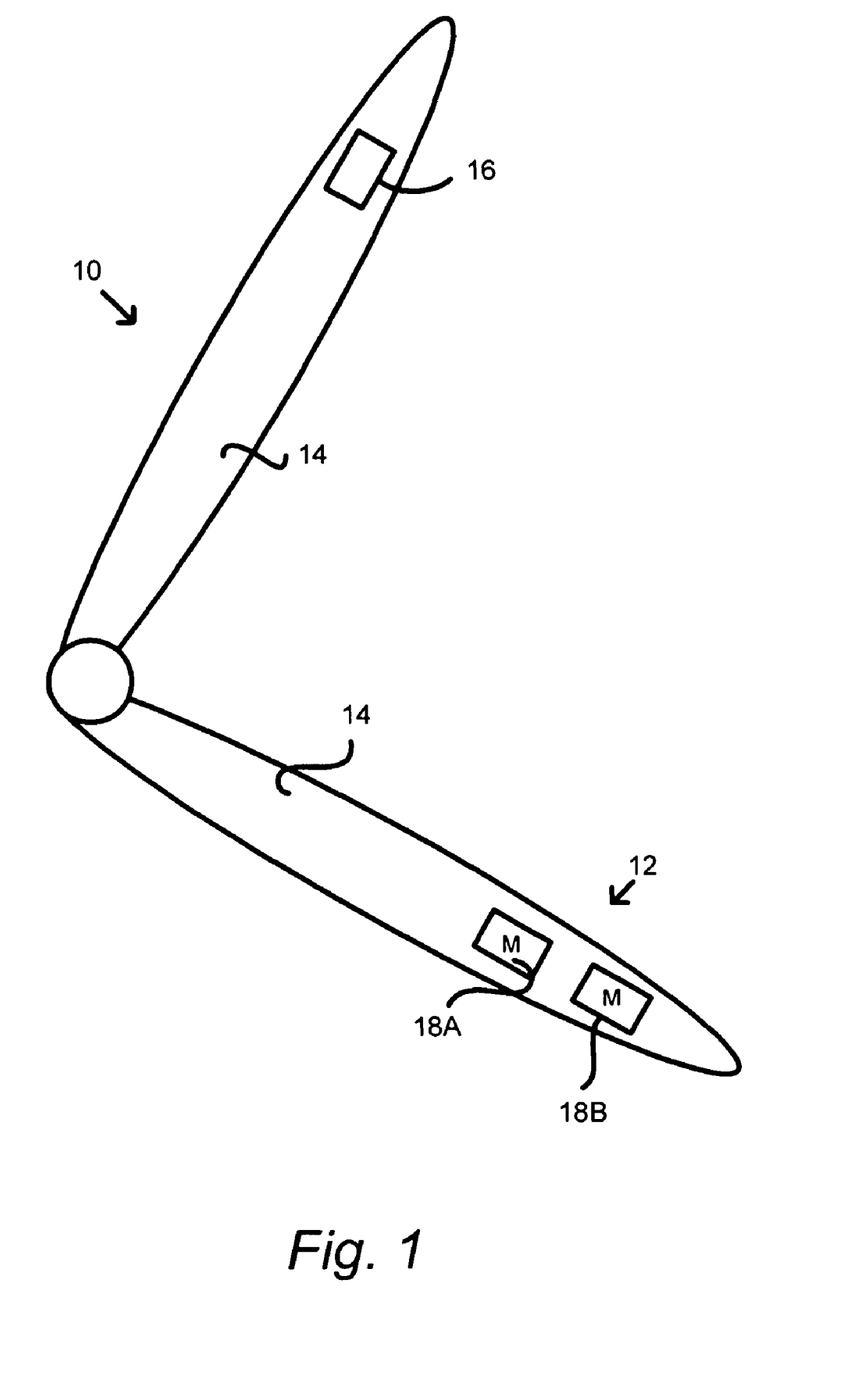
FIG. 1 schematically shows a base having a microphone system configured in accordance with illustrative embodiments of the invention.

FIG. 1 schematically shows a mobile telephone acting as a base 10 for supporting a microphone system 12 configured in accordance with illustrative embodiments of the invention. To that end, the mobile telephone (also identified by reference number 10) has a plastic body 14 containing the microphone system 12 for producing an output audio signal, an earpiece 16, and various other components, such as a keypad, transponder logic and other logic elements (not shown). As discussed in greater detail below, the microphone system 12 has a primary microphone 18A and a correction microphone 18B that are both fixedly secured in very close proximity to each other, and fixedly secured to the telephone body 14. More generally, both microphones 18A and 18B illustratively are mechanically coupled to each other (e.g., via the base 10 or a direct connection) to ensure that they receive substantially the same mechanical signals. For example, if the telephone 10 is dropped to the ground, both microphones 18A and 18B should receive substantially identical mechanical/inertial signals representing the movement and subsequent shock(s) (e.g., if the telephone 10 bounces several times after striking the ground) of the telephone 10.

In alternative embodiments, the microphone system 12 is not fixedly secured to the telephone body 14—it may be movably secured to the telephone body 14. Since they are mechanically coupled, both microphones 18A and 18B nevertheless still should receive substantially the same mechanical signals as discussed above. For example, the two microphones 18A and 18B may be formed on a single die that is movably connected to the telephone body 14. Alternatively, the microphones 18A and 18B may be formed by separate dies packaged together or separately.

The base 10 may be any structure that can be adapted to use a microphone. Those skilled in the art thus should understand that other structures may be used as a base 10, and that the mobile telephone 10 is discussed for illustrative purposes only. For example, among other things, the base 10 may be a movable or relatively small device, such as the dashboard of an automobile, a computer monitor, a video recorder, a camcorder, or a tape recorder. The base 10 also may be a surface, such as the substrate of a single chip or die, or the die attach pad of a package. Conversely, the base 10 also may be a large or relatively unmovable structure, such as a building (e.g., next to the doorbell of a house).

Figure 2:
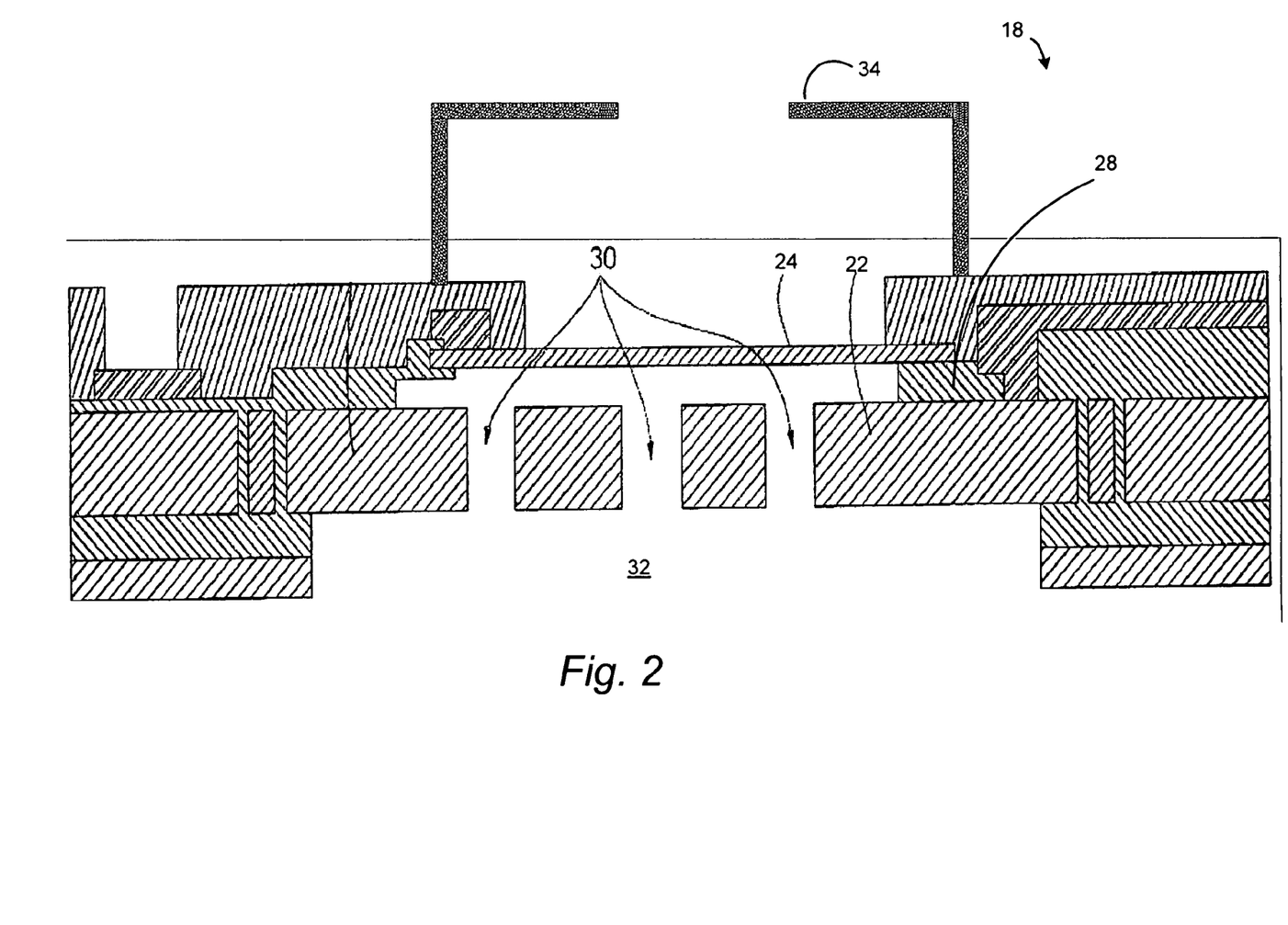
FIG. 2 schematically shows a cross-sectional view of a MEMS microphone that may be used with illustrative embodiments of the invention.

FIG. 2 schematically shows a cross-sectional view of a MEMS microphone (identified by reference number 18) generally representing the structure of one embodiment of the primary and correction microphones 18A and 18B. Among other things, the microphone 18 includes a static backplate 22 that supports and forms a capacitor with a flexible diaphragm 24. In illustrative embodiments, the backplate 22 is formed from single crystal silicon, while the diaphragm 24 is formed from deposited polysilicon. A plurality of springs 26 (not shown well in FIG. 2, but more explicitly shown in FIGS. 3A and 3B) movably connect the diaphragm 24 to the backplate 22 by means of various other layers, such as an oxide layer 28. To facilitate operation, the backplate 22 has a plurality of throughholes 30 that lead to a back-side cavity 32. Depending on the embodiment and its function, the microphone 18 may have a cap 34.

Audio signals cause the diaphragm 24 to vibrate, thus producing a changing capacitance. On-chip or off-chip circuitry (not shown) converts this changing capacitance into electrical signals that can be further processed. It should be noted that discussion of the microphone of FIG. 2 is for illustrative purposes only. Other MEMS or non-MEMS microphones thus may be used with illustrative embodiments of the invention.

One function of the primary microphone 18A is to produce a primary signal having an audio component and a (zero or non-zero) noise component. This noise component can include, among other things, 1) a mechanical portion and 2) audio responses to the mechanical portion of the noise component. For example, the mechanical portion of the noise component could be the response of the microphone when it is dropped to the ground (i.e., its diaphragm 24 moves as an inertial response). As another example, the audio response to the mechanical portion of the noise signal may be the initial sound and resultant of echoes generated when the microphone/base 10 strikes the ground. The primary microphone 18A also may be packaged or capped, as shown, (e.g., a post-processing cap or in-situ cap) with a through-hole to permit ingress of audio signals.

One function of the correction microphone 18B is to generate a correction signal that can be used to substantially mitigate much of the noise component of the primary signal. This mitigation may remove a significant portion, or a relatively small portion, of the noise component of the primary signal. Various embodiments, however, preferably remove substantially all of the discussed noise components. Removing the noise component should enhance the quality (e.g., the signal to noise ratio) of the ultimate output signal.

The overall amount and type of mitigation may depend on the application. For example, some embodiments remove the mechanical portion of a noise component only. Other embodiments remove both the mechanical portion and its audio response. Yet other embodiments may remove the audio response portion of the noise signal only.

The correction microphone 18B may be considered to act as an effective accelerometer within the microphone system 12. Accordingly, in this context, the term "microphone" may be used generally to include other devices, such as inertial sensors. Regardless its exact name, the correction microphone 18B assists in mitigating inertial based noise (i.e., signals causing undesired diaphragm displacement and related noise). In some embodiments, rather than using the discussed correction microphone 18B, the microphone system 12 thus has an accelerometer, such as one or more one, two, or three axis IMEMS accelerometers produced and distributed by Analog Devices, Inc. of Norwood, Mass.

The primary microphone 18A and correction microphone 18B preferably are formed to have substantially identical responses to audio and noise signals discussed herein. To that end, illustrative embodiments produce two microphones 18A and 18B using substantially identical fabrication processes and materials (e.g., silicon-on-insulator technology, or conventional non-SOI surface micromachining processes that deposit layers on a silicon wafer substrate). Accordingly, to the extent they can as consistent with various discussed embodiments, the microphones 18A and 18B should have substantially identical diaphragm masses, backplates, hole sizes, material, etc. . . . Alternative embodiments, however, may use different microphones 18A and 18B that are calibrated to perform the functions discussed herein.

Figure 6:
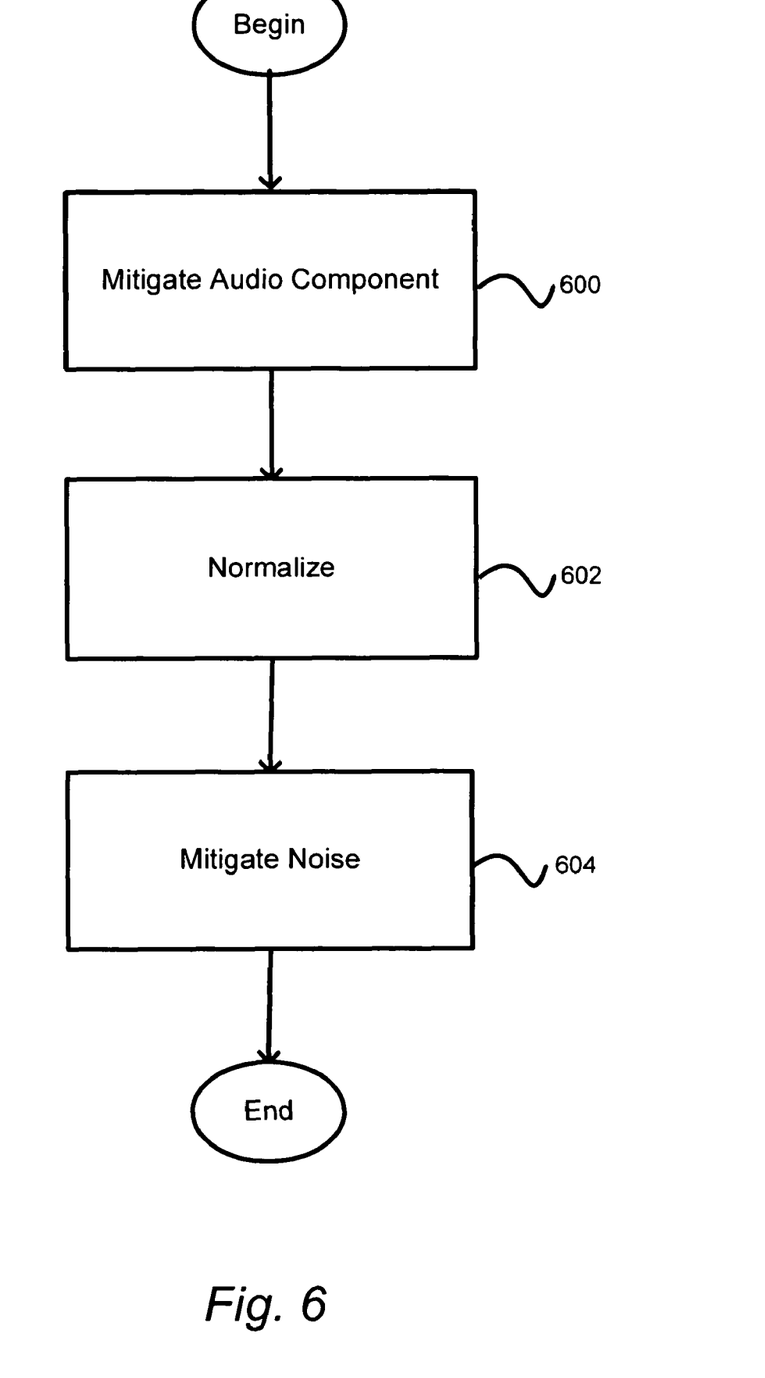
FIG. 6 shows a process used by the microphone system of FIG. 1 to produce an audible signal in accordance with illustrative embodiments of the invention.

As discussed in greater detail below with regard to FIG. 6, illustrative embodiments combine the correction signal with the primary signal to remove the noise component from the primary signal. Among other ways, illustrative embodiments may subtract the correction signal from the primary signal. Accordingly, to avoid subtracting the intended audio signal from the primary signal, illustrative embodiments of the correction signal substantially do not include the noted audio component (e.g., it may include a significantly mitigated version of the audio component). If the correction signal substantially has the audio component, it would undesirably cancel or otherwise substantially mitigate the audio component from the primary signal, thus substantially undercutting one advantage of various embodiments of the system.

Various embodiments therefore physically shield the correction microphone 18B from the input audio signal. In so doing, the correction microphone diaphragm 24 receives mechanical (or related) signals, but does not receive the audio signal. To physically shield the diaphragm 24, the correction microphone 18B may 1) have a cap 34 that provides an acoustic seal (i.e., shielding the correction microphone diaphragm 24) to the diaphragm 24, 2) be contained within a sealed package, or 3) have some other physical means for preventing the input audio signal from contacting its diaphragm 24.

Figure 3A:
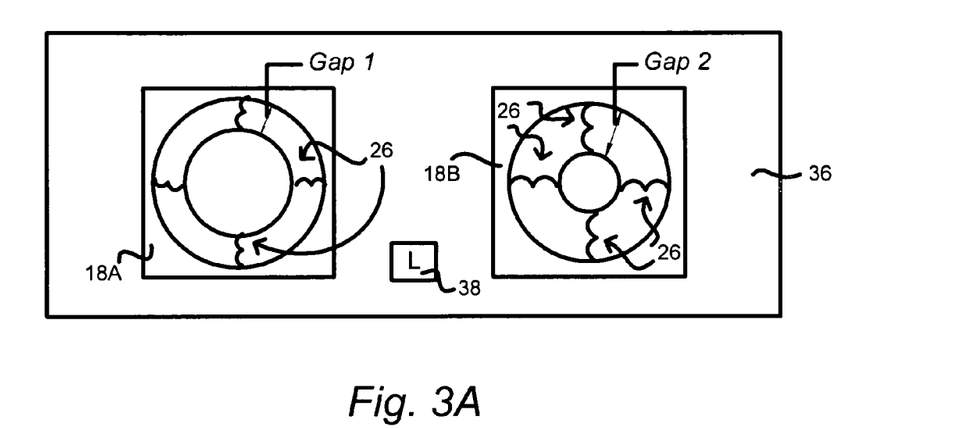
FIG. 3A schematically shows a plan view of the microphone system in accordance with a first embodiment of the invention.
Figure 3B:
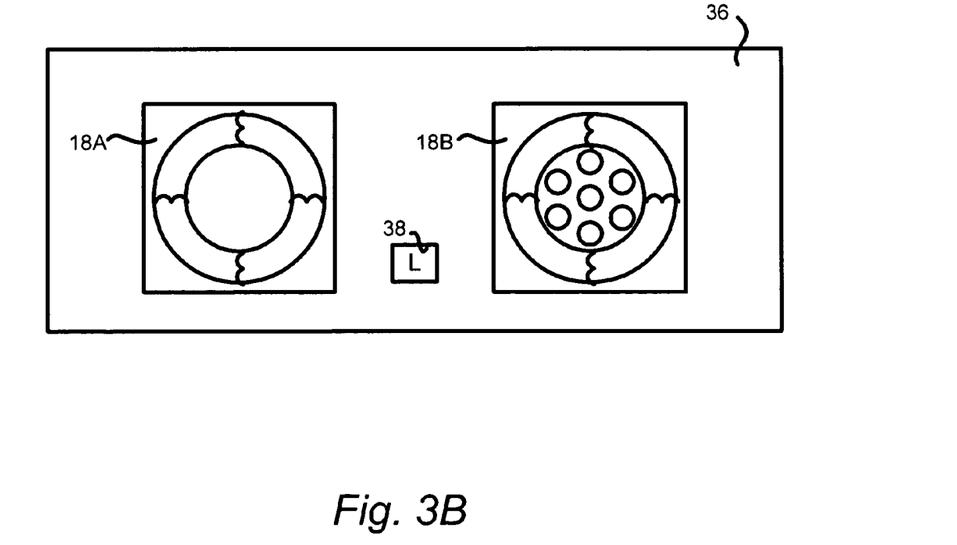
FIG. 3B schematically shows a plan view of the microphone system in accordance with a second embodiment of the invention.

Other embodiments, however, logically shield the diaphragm 24 of the correction microphone 18B from the input audio signal. If that diaphragm 24 is logically shielded, then the diaphragms 24 of both of the correction microphone 18B and the primary microphone 18A may be exposed to a common space (e.g., the space through which the desired audio signal traverses). In other words, both diaphragms 24 may receive essentially the same audio input signal. FIGS. 3A and 3B schematically show two embodiments that provide this functionality.

FIG. 3A schematically shows a plan view of the microphone system 12 in accordance with a first embodiment that logically shields the correction microphone diaphragm 24. Specifically, the microphone system 12 includes the primary and correction microphones 18A and 18B fixedly secured to an underlying printed circuit board 36, and logic 38 (see FIG. 5) for improving the quality of audio signals received by the primary microphone 18A. Because it is a plan view, FIG. 3A shows the respective diaphragms 24 of the microphones 18 and 18B and their springs 26. This configuration of having a diaphragm 24 supported by discrete springs 26 produces a gap between the outer parameter of the diaphragm 24 and the inner parameter of the structure to which each spring 26 connects. This gap is identified in FIG. 3A as "gap 1" for the primary microphone 18A, and "gap 2" for the correction microphone 18B.

Figure 4A:
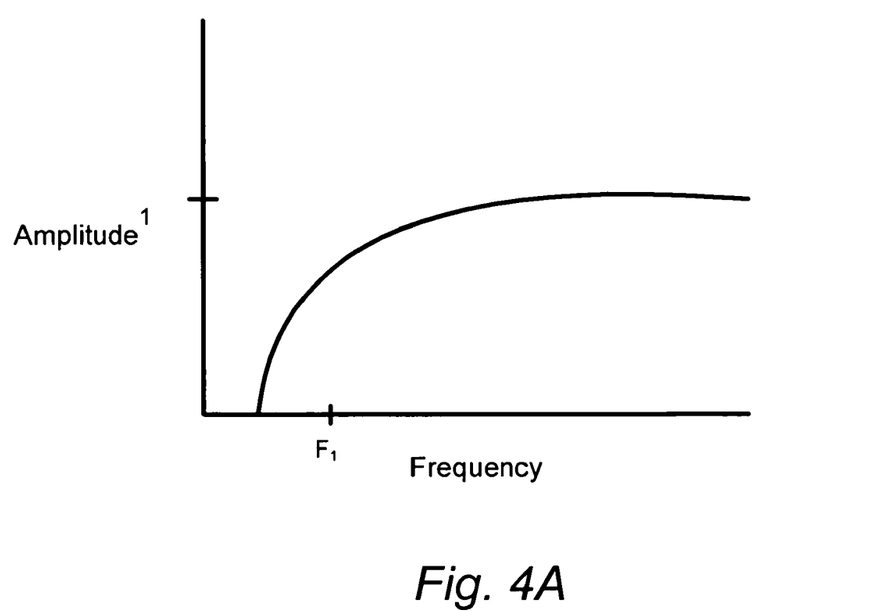
FIG. 4A schematically shows the frequency response for the primary microphone in the microphone system of illustrative embodiments of the invention.

As known by those skilled in the art, it is generally desirable to minimize the size of that gap (e.g., gap 1) to ensure that the microphone can respond to low-frequency audio signals. In other words, if the gap is too large, the microphone may not be capable of detecting audio signals having relatively low frequencies. Specifically, with respect to the frequency response of a microphone, the location of its low frequency cut-off (e.g., the 3 dB point) is a function of this gap. FIG. 4A schematically shows an illustrative frequency response curve of the primary microphone 18A when configured in accordance with illustrative embodiments of the invention. As shown, the low frequency cut-off is F1, which preferably is a relatively low frequency (e.g., 50-100 Hz, produced by an appropriately sized gap, such as a gap of about 1 micron).

It should be noted that this gap is anticipated to have no greater than a negligible impact on the inertial response of the microphone to a mechanical signal. Accordingly, although the microphone substantially does not detect audio signals having frequencies below the low frequency cut-off, it still can detect low-frequency inertial signals. For example, a microphone having a gap sized to produce a low frequency cut-off of approximately 350 Hz still should detect a mechanical signal having a frequency of 150 Hz.

Figure 4B:
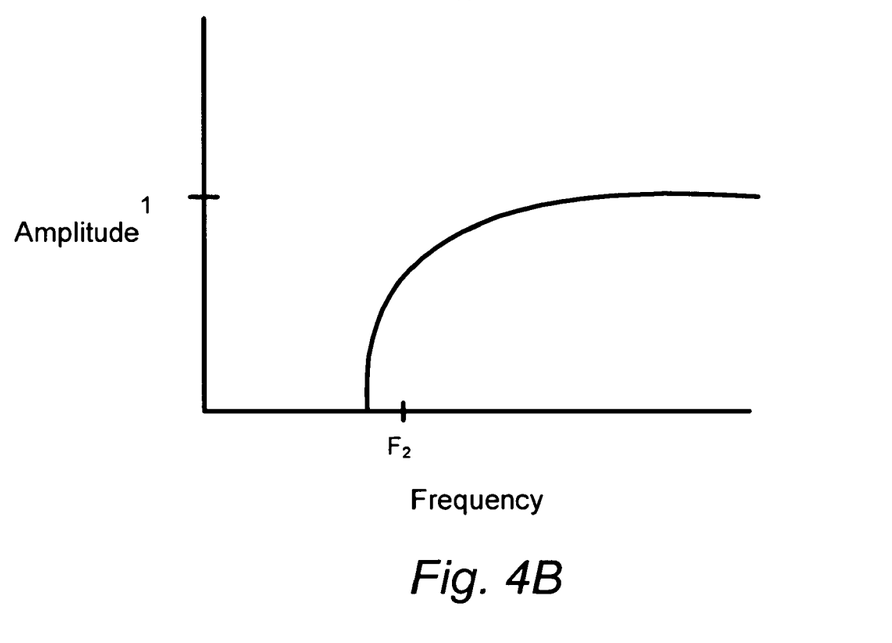
FIG. 4B schematically shows the frequency response for the correction microphone in the microphone system of illustrative embodiments of the invention.

In accordance with one embodiment of the invention, gap 2 (of the correction microphone 18B) is larger than gap 1 (of the primary microphone 18A). Accordingly, as shown in FIG. 4B (showing the frequency response of the correction microphone 18B), the low frequency cut-off F2 (e.g., 2-2.5 KHz, produced by an appropriately sized gap, such as about 5-10 microns) of the correction microphone 18B is much higher than the low frequency cut-off F1 of the primary microphone 18A. As a result, the correction microphone 18B does not adequately detect a wider range of low-frequency audio signals. In other words, increasing the size of gap 2 effectively acts as an audio high pass filter for the correction microphone 18B. As discussed in greater detail below, illustrative embodiments use this effective high pass filter in combination with a subsequent low pass filter 46 to significantly mitigate the response of the correction microphone 18B to an input audio signal. Accordingly, the correction microphone 18B does not require some means to shield it from an input audio signal (e.g., a cap 34).

There are various ways to make gap 2 larger than gap 1 while still ensuring that both microphones 18A and 18B have substantially identical responses to noise signals. Among other ways, the diaphragms 24 may be formed to have substantially identical masses. To that end, the diaphragm 24 of the correction microphone 18B may be thicker than the diaphragm 24 of the primary microphone 18A, while the diameter of the diaphragm 24 of the correction microphone 18B is smaller than the diameter of the diaphragm 24 of the primary microphone 18A.

In other embodiments, the diaphragm masses may be different. In that case, internal or external logic may be used to compensate for the mass differences. For example, if the mass of the correction microphone diaphragm 24 is half that of the primary microphone diaphragm 24, then logic may multiply the signal from the correction microphone 18B by a scalar value (e.g., a scalar of two). Logic therefore causes the effective vibration output of the two microphones to be effectively the same. Stated another way, the mechanical responses of the two microphones may be considered to be effectively the same if 1) they do, in fact, have the same diaphragm masses, or 2) if logic compensates for diaphragm mass differences to effectively cause them to appear the same (e.g., applying a scalar). In yet other embodiments, the two microphones may be entirely different and thus, other logic is required to ensure accurate results consistent with those discussed herein.

FIG. 3B schematically shows another embodiment in which the gaps discussed above are substantially identical. Despite having identical gaps, the correction microphone 18B still is configured to have a frequency response as shown in FIG. 4B (i.e., having a higher low frequency cut-off). To that end, the diaphragm 24 of the correction microphone 18B has one or more perforations or through-holes that effectively increase the low frequency cut-off. Specifically, the low frequency cut-off is determined by the amount of area defined by the gap and the hole(s) through the diaphragm 24. This area thus is selected to provide the desired cutoff frequency.

In general terms, the embodiments shown in FIGS. 3A and 3B are two of a wide variety of means for controlling the air leakage past the respective diaphragms 24. In other words, those embodiments control the rate at which air flows past the diaphragm, thus controlling the respective low frequency cut-off points. Those skilled in the art therefore can use other techniques for adjusting the desired low frequency cut-off of either microphone 18A and 18B.

Figure 5:
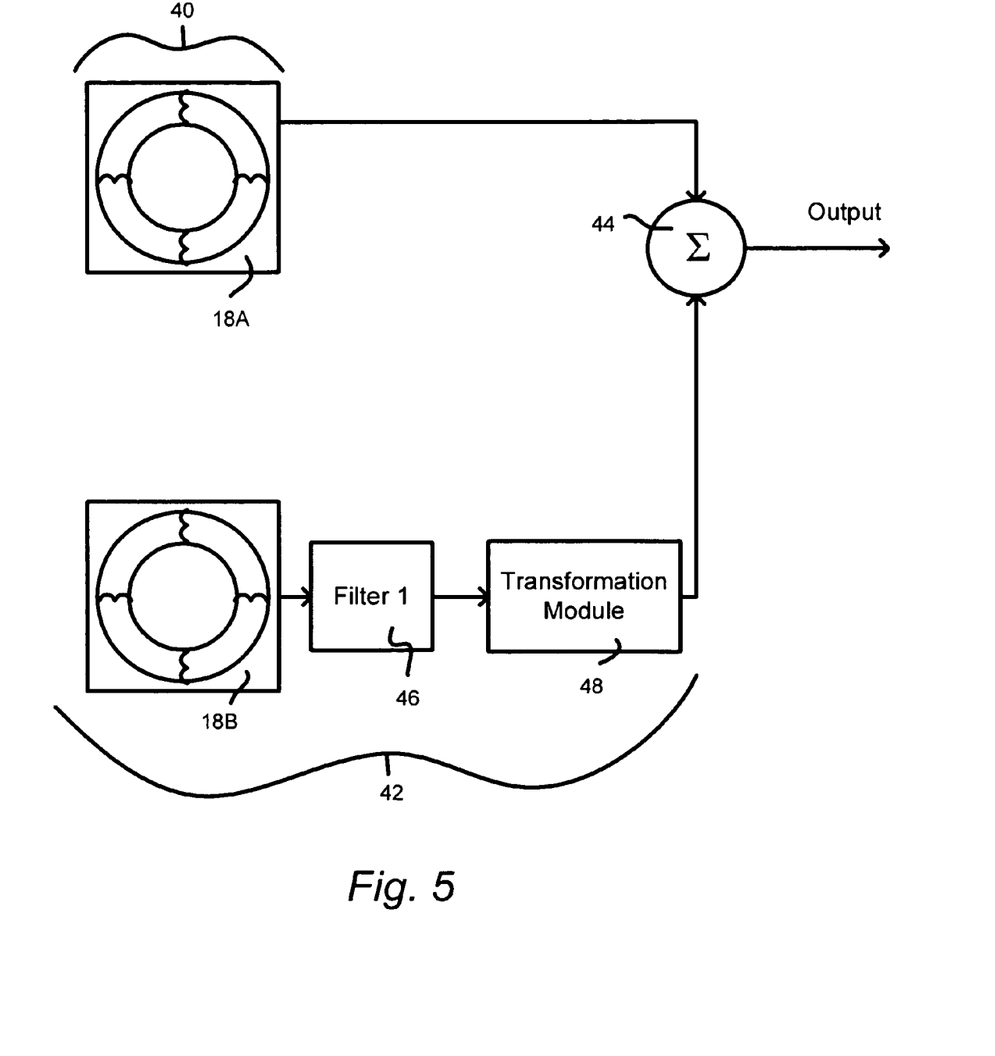
FIG. 5 schematically shows additional details of illustrative embodiments of the microphone system, including filters and combination logic.

As noted above, illustrative embodiments combine the correction signal with the primary signal to remove the noise component from the primary signal. To that end, FIG. 5 schematically shows various elements of the microphone system 12 for accomplishing those ends. In general, the microphone system 12 has a primary microphone apparatus 40 having the primary microphone 18A, and a correction microphone apparatus 42 having the correction microphone 18B and two subsequent processing stages 46 and 48 (i.e., logic 38). Summation logic 44 (also referred to as "combining logic 44") combines the outputs from the two microphone apparatuses to generate an output audio signal that preferably has a relatively low noise component.

As noted above, the correction microphone apparatus 42 generates a noise component for mitigating the noise component of the primary signal. To that end, the correction microphone apparatus 42 has 1) a low pass filter 46 for substantially mitigating audio components in the correction signal received from the correction microphone 18B, and 2) a signal transformation module 48 for normalizing the audio response to the mechanical portion of the noise component.

More specifically, although they illustratively are very similar, the two microphones 18A and 18B still may have some differences. For example, due to the tolerances and limits of their fabrication process, the microphones 18A and 18B may have some minor differences, such as the diaphragm thickness. In fact, as noted herein, some embodiments use different types of devices to serve the function of one or both of the microphones 18A and 18B (e.g., the correction microphone 18B may be a conventional accelerometer). As another example, the microphones 18A and 18B are spaced from each other. The correction microphone 18B therefore may receive a slightly time delayed version of an audio and/or noise signal.

Unless normalized, these differences can cause the noise components of the two microphones 18A and 18B to vary. If they vary too much, the output signal may be corrupted or have a less desirable signal to noise ratio. Illustrative embodiments thus compensate for the impact of these and other differences between the two microphones 18A and 18B to ensure that the two microphones 18A and 18B have substantially identical noise components. As noted above, this process may be referred to herein as a "normalization" process.

To that end, the signal transformation module 48 compensates for differences between the primary microphone 18A and the correction microphone 18B. In illustrative embodiments, the signal transformation module 48 is a conventional adaptive filter. In alternative embodiments, the signal transformation module 48 is a fixed filter. Other devices may be used to achieve the noted results. The respective filters may be any conventionally known filter used for the noted purposes. For example, if used, the adaptive filter may be a least mean squared adaptive filter, also referred to in the art as an "LMS" filter.

Accordingly, in illustrative embodiments, the correction microphone apparatus 42 generates a signal having no greater than a negligible amount of the audio signal, thus substantially comprising a noise component. It is this noise component that is used to remove the corresponding noise component generated by the primary microphone apparatus 40.

The microphone system 12 therefore has combining logic 44 to combine the two signals. Among other things, as noted above, the combining logic 44 may include conventional subtraction logic that subtracts the signal generated by the correction microphone apparatus 42 from the signal generated by the primary microphone apparatus 40. In alternative embodiments, the combining logic 44 may include an adder. For example, in such embodiments, the microphones 18A and 18B may be positioned within the base 10 to generate signals that are 180 degrees out of phase. More specifically, it is contemplated that one microphone could be oriented so that the top surface of its diaphragm 24 faces upwardly, while the other microphone could be oriented so that the top surface of its diaphragm 24 faces downwardly. Of course, those skilled in the art should understand that other combining logic 44 may be used to facilitate system implementation.

It should be noted that the signal generated by the correction microphone apparatus 42 may be considered to be the above noted correction signal (i.e., as processed by the filters). In a similar manner, the signal generated by the primary microphone apparatus 40 also may be considered to be the above noted primary signal (i.e., as processed by any intervening logic elements, not shown). Accordingly, for simplicity, the output signals of the primary microphone apparatus 40 and the correction microphone apparatus 42 respectively are referred to as the primary signal and correction signal.

FIG. 6 shows a process of generating an output audio signal in accordance with illustrative embodiments of the invention. The process begins at step 600 by substantially mitigating the audio component from the signal generated by the correction microphone 18B. To that end, the correction output signal is filtered by the low pass filter 46. As noted above, when using the embodiments of FIGS. 3A, 3B, or other related embodiment, the correction microphone 18B naturally filters signals having frequencies that are less than the low frequency cut-off of the low pass filter 46. For example, if the frequency response of the correction microphone 18B has a low frequency cut-off of about 200 Hz, then the low pass filter 46 should similarly have a high frequency cut-off of about 190-200 Hz or greater.

Accordingly, after executing step 600, the correction output signal should have substantially no non-negligible audio component corresponding to an input audio signal. This step may be skipped, however, for those embodiments that shield the diaphragm 24 from the input audio signal.

Before, contemporaneously with, or after executing step 600, the process normalizes the audio response to the mechanical portion of the noise component (step 602). Embodiments that do not remove this audio response may skip this step. In the general case, however, the signal transformation module 48 may be retained in the system as an all pass filter that is selectively activated. Alternatively, the signal transformation module 48 may be eliminated.

At this point in the process, the correction microphone apparatus 42 should have generated a correction signal having a noise component that is substantially identical to the noise component in the primary signal. Both signals thus are forwarded to the summation logic 44 to remove/mitigate the noise component from the primary signal (step 604), thus ending the process. In other words, step 604 removes both the mechanical portion of the noise signal, as well as its associated audio response.

As noted above, depending upon the orientation of the microphones 18A and 18B, the summation logic 44 may subtract or add the two signals. Of course, other logic may be used in place of, or in addition to, the discussed subtraction and addition logic. Accordingly, discussion of specific subtraction or addition logic is illustrative only and not intended to limit all embodiments of the invention.

Illustrative embodiments therefore should significantly improve signal to noise ratios over conventional single microphone systems known to the inventors. It should be reiterated that various of the components shown in the drawings are illustrative and not intended to limit the scope of all embodiments. For example, additional components may be used to optimize operation. As another example, the microphone system 12 may have more than two microphones 18A and 18B or microphone apparatuses. Instead, among other things, the microphone system 12 may have three or more microphones, or three or more microphone apparatuses. Moreover, one or more of the microphone apparatuses may include just microphones (e.g., the correction microphone 18B may have just a cap 34 with no audio input port).

Various embodiments of the invention may at least have portions implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, some portions of the disclosed apparatus and methods (e.g., see the flow chart described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A microphone system comprising:
   a base;
   a first microphone apparatus coupled to the base, the first microphone apparatus capable of producing a first output signal having a noise component;
   a second microphone apparatus coupled to the base, the second microphone apparatus capable of producing a second output signal; and
   combining logic operatively coupled with the first microphone apparatus and the second microphone apparatus, the combining logic using the second output signal to remove at least a portion of the noise component from the first output signal,
   the first microphone apparatus comprising a first microphone, the second microphone apparatus comprising a second microphone, the second microphone being configured to form an acoustic high pass filter having a low frequency cut-off that is greater than the low frequency cut-off of the first microphone, the second microphone being logically shielded from input audio signal,
   wherein the first microphone has a first diaphragm and a first circumferential gap defined at least in part by the first diaphragm, the second microphone having a second diaphragm and a second circumferential gap defined at least in part by the second diaphragm, the second circumferential gap greater than the first circumferential gap.

2. The microphone system as defined by claim 1 wherein the second output signal comprises data relating to the mechanical response of the first microphone apparatus.

3. The microphone system as defined by claim 1 wherein the second microphone has a diaphragm and a cap acoustically sealing the diaphragm.

4. The microphone system as defined by claim 1 wherein the first microphone has a first diaphragm, the second microphone having a second diaphragm, the first and second diaphragms being exposed to a common space.

5. The microphone system as defined by claim 1 wherein the second microphone apparatus includes a signal transformation module.

6. The microphone as defined by claim 1 wherein the first microphone and second microphone have different air leakage rates for providing the first and second microphones with different low frequency cut-off points.

7. The microphone system as defined by claim 1 wherein the first microphone and second microphone are formed on a single die.

8. The microphone system according to claim 1, wherein the first microphone and second microphone are formed on a single die or packaged within a single semi conductor package.

9. A method of producing an output audio signal from a microphone system, the method comprising:
   providing a base having a first microphone for generating a first microphone output signal in response to an input audio signal and a mechanical signal, the first microphone output signal having an audio component and a mechanical component, the base also having a second microphone for generating a second microphone output signal in response to the mechanical signal; and wherein the second microphone being logically shielded from input audio signal;

using information from the second microphone output signal to remove at least a portion of the mechanical component from the first microphone output signal, the first microphone having a first diaphragm that defines a first circumferential gap, the second microphone having a second diaphragm that defines a second circumferential gap, the second circumferential gap being greater than the first circumferential gap.

10. The method as defined by claim 9 wherein the second microphone output signal has a second audio component, using comprising removing at least a portion of the second audio component from the second microphone output signal.

11. The method as defined by claim 9 further comprising fixed or adaptively filtering the second microphone output signal.

12. The method as defined by claim 11 wherein the second microphone output signal has a second audio component, using comprising removing at least a portion of the second audio component from the second microphone output signal before filtering.

13. The method as defined by claim 9 wherein the first microphone has a first diaphragm, the second microphone having a second diaphragm, the method exposing the first and second diaphragms to the input audio signal.

14. The method as defined by claim 9 wherein the base is a single die.

* * * * *